US011541309B2

(12) United States Patent
Fear

(10) Patent No.: US 11,541,309 B2
(45) Date of Patent: Jan. 3, 2023

(54) QUICKLY SUSPENDING AND RESUMING APPLICATIONS RUNNING ON A CLOUD SERVER

(71) Applicant: Nvidia Corporation, Santa Clara, CA (US)

(72) Inventor: Andrew Fear, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 142 days.

(21) Appl. No.: 16/530,512

(22) Filed: Aug. 2, 2019

(65) Prior Publication Data

US 2019/0351321 A1    Nov. 21, 2019

Related U.S. Application Data

(63) Continuation of application No. 13/655,510, filed on Oct. 19, 2012, now abandoned.

(51) Int. Cl.
| | |
|---|---|
| *A63F 13/493* | (2014.01) |
| *A63F 13/45* | (2014.01) |
| *A63F 13/35* | (2014.01) |
| *A63F 13/335* | (2014.01) |

(52) U.S. Cl.
CPC ............ *A63F 13/45* (2014.09); *A63F 13/335* (2014.09); *A63F 13/35* (2014.09); *A63F 13/493* (2014.09); *A63F 2300/636* (2013.01)

(58) Field of Classification Search
CPC ........ A63F 13/35; A63F 13/335; A63F 13/45; A63F 13/493; A63F 2300/636
See application file for complete search history.

(56) References Cited

U.S. PATENT DOCUMENTS

| | | | |
|---|---|---|---|
| 4,948,138 A | 8/1990 | Pease et al. | |
| 6,758,757 B2 | 7/2004 | Luciano, Jr. et al. | |
| 6,811,486 B1 | 11/2004 | Luciano, Jr. | |
| 7,182,690 B2 | 2/2007 | Giobbi et al. | |
| 7,814,081 B2 | 10/2010 | Futagawa | |
| 7,979,740 B2 | 7/2011 | Taylor et al. | |
| 8,162,747 B2 | 4/2012 | Hayasaka | |
| 9,138,644 B2 * | 9/2015 | Perlman | ............... H04N 19/172 |

(Continued)

OTHER PUBLICATIONS

"Coop Pausing", https://forums.beamdog.com/discussion/2055/co-op-pausing, Jul. 2012 (Year: 2012).*

(Continued)

*Primary Examiner* — James S. McClellan
*Assistant Examiner* — Ross A Williams

(57) ABSTRACT

Many times, users play games to certain places in the game and decide to save the game and resume it later. When users resume the game, they have to wait for it to load, wade through menus to select the saved game, and wait again for the game to resume. The introduced technique directly suspends and resume games that are rendered on a cloud server based on user initiated suspend and resume control commands. As the games are directly suspended and resumed, the users can skip past menu and screen loading. The introduced technique can track game information of multiples users in cloud tokens, and can move these cloud tokens from one memory location to another based on the user initiated suspend and resume control commands.

20 Claims, 5 Drawing Sheets

(56) References Cited

U.S. PATENT DOCUMENTS

| | | | |
|---|---|---|---|
| 2002/0055381 | A1 | 5/2002 | Tarantino |
| 2004/0224772 | A1* | 11/2004 | Canessa ............... A63F 13/795 |
| | | | 463/40 |
| 2005/0192087 | A1 | 9/2005 | Friedman et al. |
| 2006/0068870 | A1 | 3/2006 | Crawford, III et al. |
| 2006/0247021 | A1 | 11/2006 | Bulthuis |
| 2010/0227691 | A1* | 9/2010 | Karsten ............... G07F 17/3239 |
| | | | 463/42 |
| 2010/0285878 | A1 | 11/2010 | Tarantino |
| 2010/0293115 | A1* | 11/2010 | Seyed Momen ......... A61F 2/72 |
| | | | 706/12 |
| 2011/0122063 | A1* | 5/2011 | Perlman ............... H04N 19/169 |
| | | | 345/161 |
| 2012/0322537 | A1 | 12/2012 | Antkowiak et al. |
| 2015/0121402 | A1 | 4/2015 | Pajuelo Gonzalez et al. |
| 2016/0184712 | A1* | 6/2016 | Colenbrander ......... A63F 13/49 |
| | | | 463/29 |

OTHER PUBLICATIONS

"Pausing the game in multiplayer", https://gamedev.net/forums/topic/607290-pausing-the-game-in-multiplayer/4842031/ (Year: 2011).*

Gookin, D., "How to Change What Closing the Lapton Lid Does" Troubleshooting your PCT for Dummies, 3rd Edition, Mar. 2008, 2 pages, <URL: http://www.dummies.com/how-to/content/how-to-change-what-closing-the-laptop-lid-does.html>.

Snex9x: The Portable Super Nintendo Entertainment System Emulator, Apr. 2011, <URL: http://files.ipherswipsite.com/snes9x/snes9x-1.53-win32-x64.zip>.

* cited by examiner

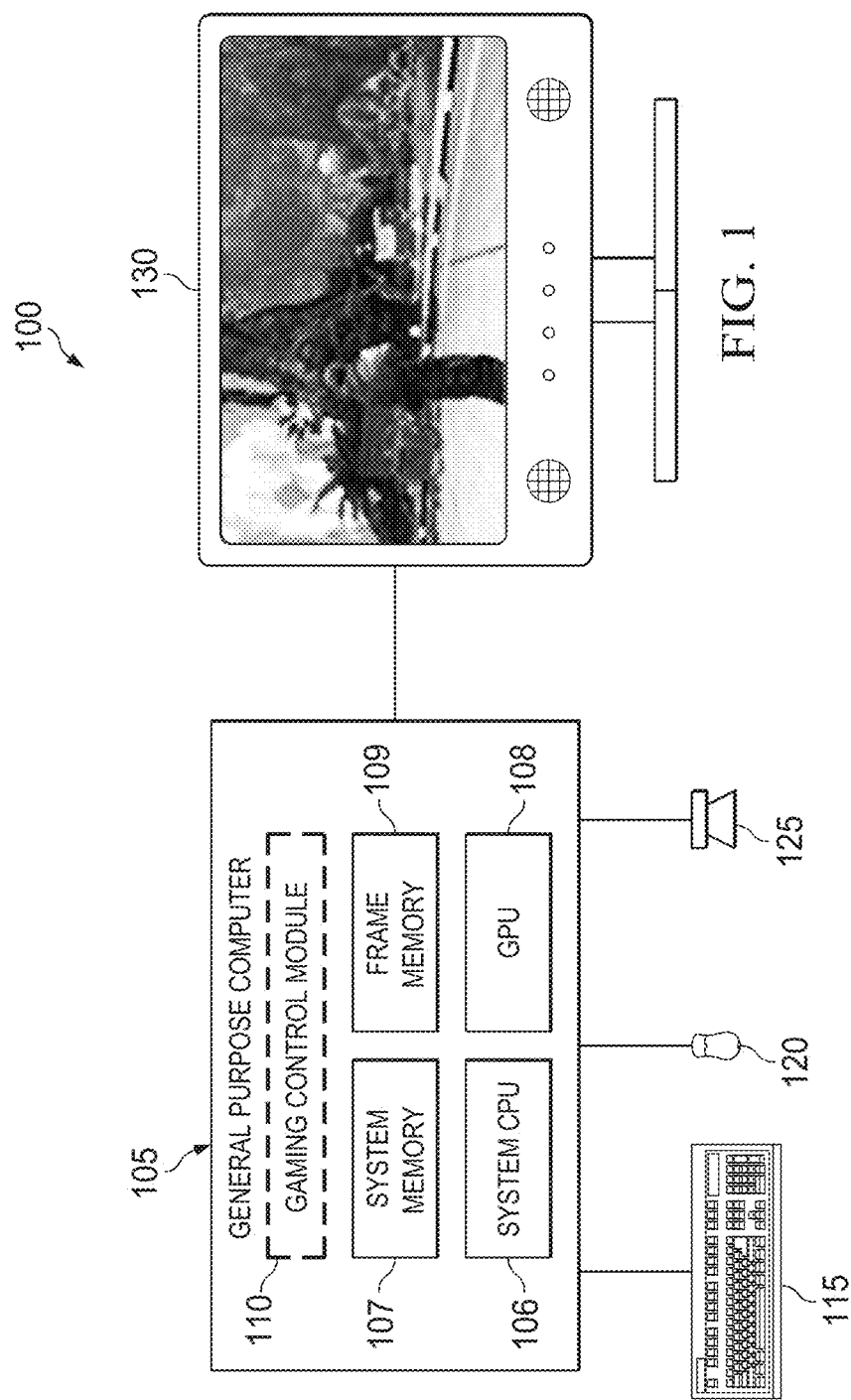

QUICKLY SUSPENDING AND RESUMING APPLICATIONS RUNNING ON A CLOUD SERVER

CROSS-REFERENCE TO RELATED APPLICATION

This application is a continuation of U.S. patent application Ser. No. 13/655,510, entitled "QUICK-RESUME GAMING", filed on Oct. 19, 2012, by Andrew Fear, which is currently pending, is commonly assigned with this application, and incorporated herein by reference in its entirety.

TECHNICAL FIELD

This disclosure is directed, in general, to cloud computing and, more specifically, to a cloud arrangement for quickly resuming/suspending applications, such as a game application, running on a cloud server.

BACKGROUND

Video gaming, played on a local gaming device (such as a personal computer), is a rapidly growing commercial field that is receiving a great deal of attention due to its universal interest and appeal. Many times, users play these games to certain places in the game and decide that they have reached a point where they want to quit playing the game and resume it later. Some games do have a "saved games" feature, which allows a player to resume playing the game from different locations inside the game. However, users have to start the game, wait for it to load, wait through menus, then select the saved game to restore, and wait for the game to finally load.

SUMMARY

In one embodiment, a cloud server is provided. The cloud server is configured to: generate display rendering information for a computer application employing a graphics processor; encode the display rendering information as a video stream; send the video stream to a remote client; and directly suspend and resume the video stream at a current frame of the computer application based on user initiated suspend and resume control commands.

In another aspect, a method for operating a cloud server is provided. The method includes: generating display rendering information for a computer application employing a graphics processor in a cloud server; encoding the display rendering information as a video stream; sending the video stream to a remote client; and directly suspending and resuming the video stream at a current frame of the computer application based on user initiated suspend and resume control commands.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIG. 1 illustrates a block diagram of an embodiment of a quick-resume gaming system constructed according to the principles of the present disclosure;

DETAILED DESCRIPTION

Figure 2B:
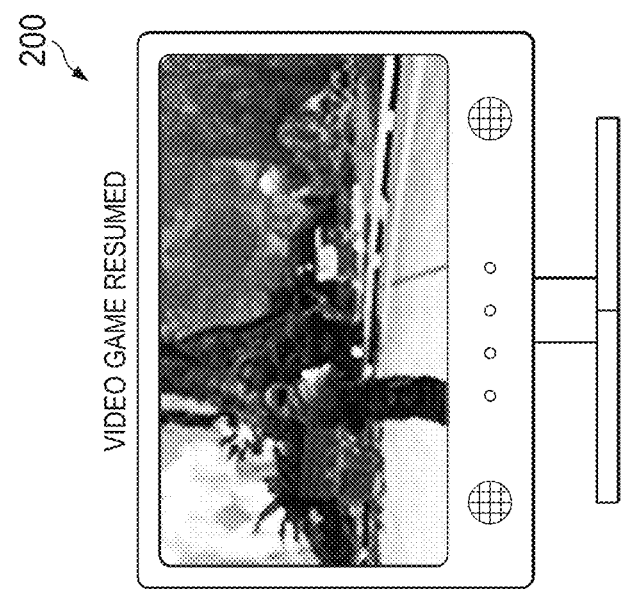
FIGS. 2A and 2B illustrate examples of a frame of a local monitor with a video game suspended and with the video game resumed, respectively.

FIG. 1 illustrates a block diagram of an embodiment of a quick-resume gaming system, generally designated 100, constructed according to the principles of the present disclosure. The quick-resume gaming system 100 includes a game device employing a general purpose computer 105 with a computer keyboard 115, a computer mouse 120 serving as a computer pointing device, a specialized game board or pad 125 and a local monitor 130. Here, the game device is employed as a standalone gaming system, which provides needed display rendering information.

In the illustrated embodiment, the general purpose computer 105 includes a system central processing unit (CPU) 106, a system memory 107, a graphics processing unit (GPU) 108 and a frame memory 109. The general purpose computer 105 also includes a gaming control module 110. The system CPU 106 is coupled to the system memory 107 and the GPU 108 and provides general computing processes and control of operations for the local computer 105. The system memory 107 includes long term memory storage (e.g., a hard drive) for computer applications and random access memory (RAM) to facilitate computation by the system CPU 106. The GPU 108 is further coupled to the frame memory 109 and provides monitor display and frame control of the local monitor 130.

The gaming control module 110 is generally indicated in the local computer 105, and in one embodiment is a software module that corresponds to software included with a video game or software that is independent of the video game. The gaming control module 110 may operationally reside in the system memory 107, the frame memory 109 or in portions of both.

The gaming control module 110 is coupled within the general purpose computer 105 to suspend and resume playing of the video game at a current display frame (e.g., the display frame indicated on the local monitor 130) based on user initiated suspend and subsequent resume control commands, respectively. That is, a player of the video game can suspend and later resume the video game at an exact point in time inside the video game, thereby allowing the player to skip past all startup screens, menus, and saved game selection processes.

Figure 2A:
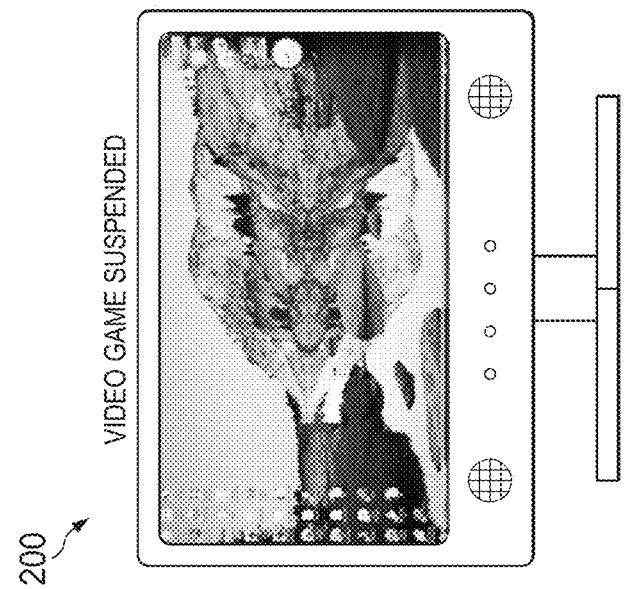

This process is illustrated in FIGS. 2A and 2B, where FIG. 2A shows an example of a frame of the local monitor 130 with the video game suspended, and FIG. 2B shows the same frame of the local monitor 130 in FIG. 1, immediately following resumption of the video game.

Embodiments of the present disclosure allow a user to employ a keyboard stroke of the keyboard 115 to act as the suspend and resume control commands. Of course, the same or different keys and keyboard strokes may be employed to suspend and resume the video game at the current display frame. Correspondingly, successive clicks of the computer mouse 120 may be employed to accomplish the suspending and resuming of the video game at the same computer display frame. Additionally, the user may employ the specialized game board 125 to suspend and resume the computer display frame. If the game device is a laptop or notebook computer having general purpose computing capabilities, the suspend and resume control commands may correspond to closing and opening the laptop or notebook computer, respectively.

In the standalone, quick-resume gaming system 100, the suspend control command causes the contents of memory locations controlling the current game display frame to be stored in the long term memory portion of the system memory 107. As illustrated in FIG. 2A, a regular display frame (employed during suspension of the current game display frame) may correspond to a normal wallpaper view. Alternately, the regular display frame may be another view associated with a computer application being employed by the user. Upon activation of the resume control command, the stored content of the memory locations (that were originally controlling the game display frame) is restored to its previous locations thereby restoring the game display frame to its previous condition just prior to its suspension, as indicated in FIG. 2B.

Figure 3:
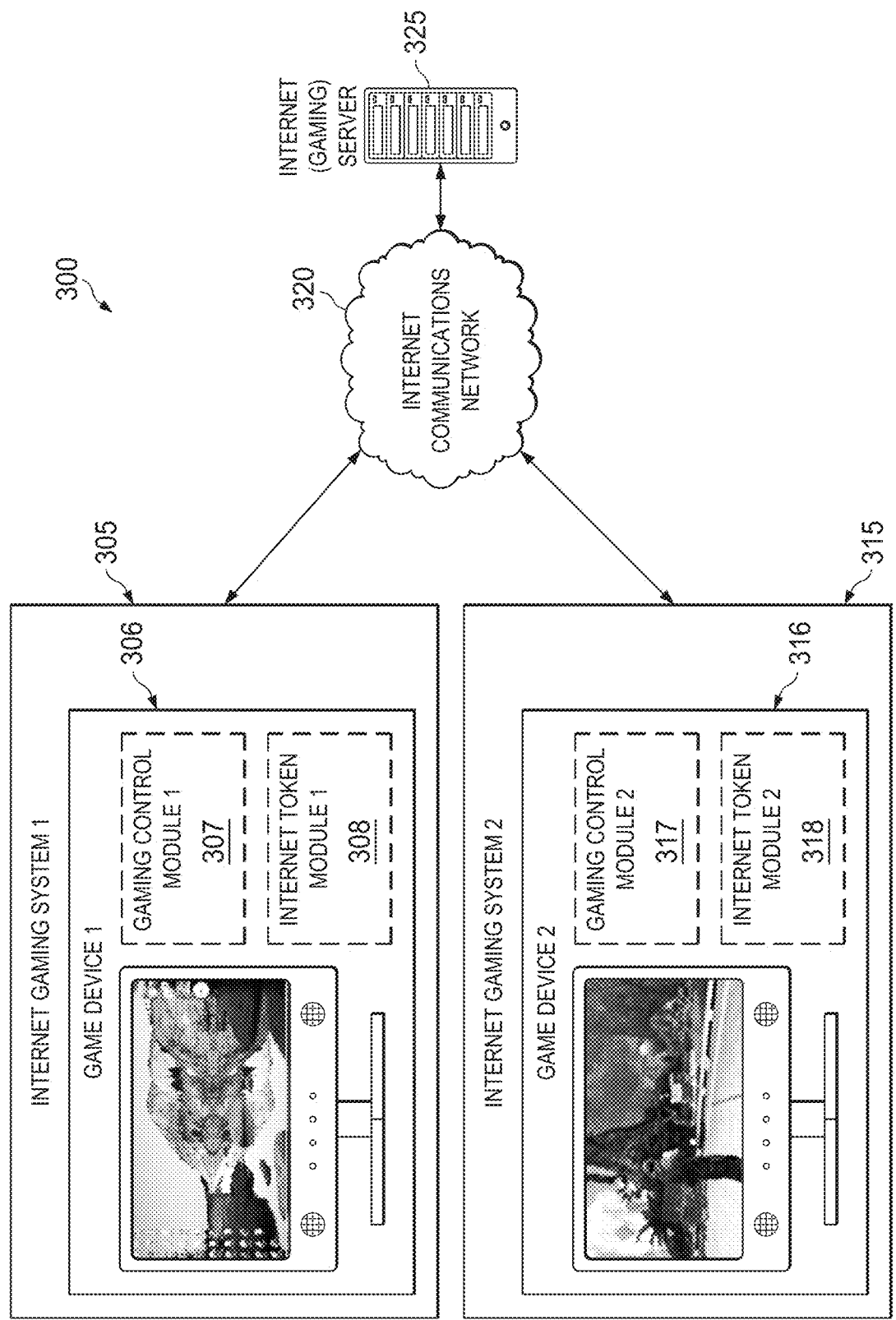
FIG. 3 illustrates a diagram of an embodiment of an Internet gaming arrangement constructed according to the principles of the present disclosure.

FIG. 3 illustrates a diagram of an embodiment of an Internet gaming arrangement, generally designated 300, constructed according to the principles of the present disclosure. The Internet gaming arrangement 300 includes first and second Internet gaming systems 305, 315, an Internet communications network 320 and an Internet server 325. The first and second Internet gaming systems 305, 315 and the Internet server 325 are linked to one another through the Internet communications network 320, as shown. The first Internet gaming system 305 includes a first game device 306 having a first gaming control module 307 and a first Internet token module 308. Similarly, the second Internet gaming system 315 includes a second game device 316 having a second gaming control module 317 and a second Internet token module 318.

As before, each of the first and second game devices 306, 316 is configured to support playing a video game by a user. Correspondingly, each of the first and second gaming control modules 307, 317 is coupled to its respective game device and is configured to suspend and resume playing of the video game at a current display frame based on respective user initiated suspend and resume control commands. Additionally, each of the first and second Internet token modules 308, 318 is configured to store an Internet token in its respective game device 306, 316 corresponding to the Internet server 325, wherein the Internet token facilitates suspending and resuming the current display frame for the Internet server 325. Each of the first and second Internet tokens are generally computer files that store data specific to their respective first or second Internet gaming systems 305, 315 and the Internet server 325 and depend on the gaming environment.

The first and second game devices 306, 316 may employ standalone computer systems corresponding to the one discussed with respect to FIG. 1. These would include desktop, laptop or notebook computer systems having the capabilities previously discussed. As such, the first and second game devices 306, 316 operate as thick clients connected to the Internet server 325 through the Internet communications network 320. Additionally, the first and second game devices 306, 316 provide their own local display rendering information, as before.

The Internet server 325 serves as a gaming server in this embodiment and maintains specific data about a game world (environment) being played as well as data corresponding to the first and second gaming computers 305, 315. Of course, more than two gaming computers and multiple gaming servers may be employed in this gaming environment.

The Internet gaming arrangement 300 allows online game playing between the first and second Internet gaming systems 305, 315. The first and second Internet token modules 308, 318 serve to respectively store first and second Internet tokens that correspond to the Internet server 325. Each of the first and second Internet tokens is employed by the Internet server 325 and respectively indicates suspending and resuming current gaming display frames in the first and second game devices 306, 316.

As indicated, the first and second Internet tokens are computer files that are configured to store data that is specific to their respective first and second game devices 306, 316 and the Internet server 325. These Internet tokens allow the Internet server 325 to keep track of game information for the first and second Internet gaming systems 305, 315, especially during a period when one of them is employed to suspend or resume playing a game. In the illustrated embodiment of FIG. 3, the first Internet gaming system 305 has just suspended playing the game, and the first Internet token allows the Internet server 325 to recognize this condition or state. Then, the suspended game state of the first gaming computer 305 may be indicated to the second Internet gaming system 315 by the Internet server 325, thereby allowing its user to take appropriate action.

Additionally, when either of the first and second Internet gaming systems 305, 315 enters a game suspended state, contents of memory locations controlling its current game display frame along with its corresponding Internet token are stored in the long term memory portion of its system memory, as indicated before. Resumption of the game reverses this action thereby making the stored game display frame and the Internet token active again.

Figure 4:
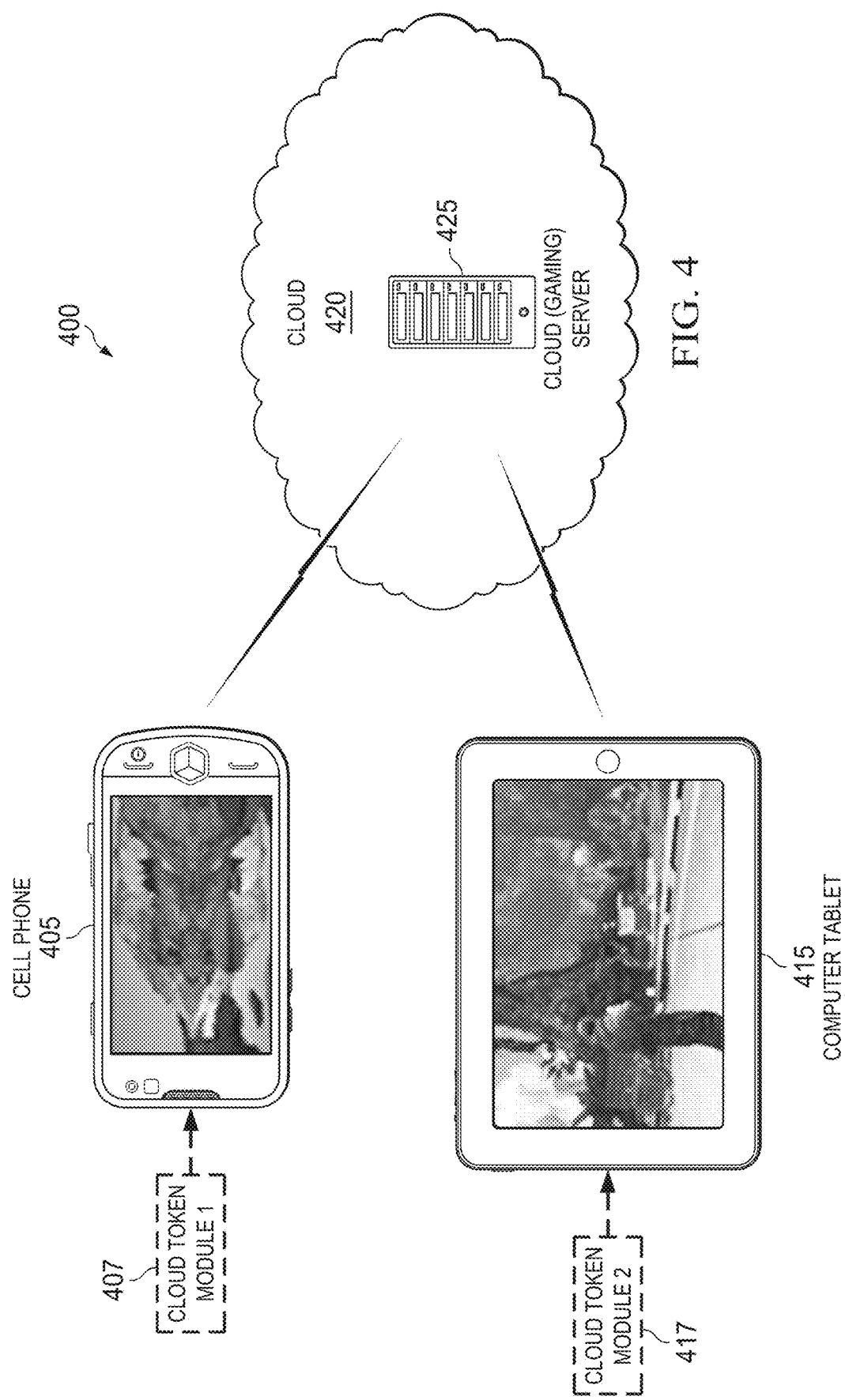
FIG. 4 illustrates a diagram of an embodiment of a cloud gaming arrangement constructed according to the principles of the present disclosure.

FIG. 4 illustrates a diagram of an embodiment of a cloud gaming arrangement, generally designated 400, constructed according to the principles of the present disclosure. The cloud gaming arrangement 400 includes first and second cloud gaming systems 405, 415 and a cloud network 420 employing a cloud server 425. The first and second cloud gaming systems 405, 415 employ respective game devices that are thin clients having gaming control modules, as discussed previously. Additionally, they include first and second cloud token modules 407, 417, as shown. The first and second cloud token modules 407, 417 store respective cloud tokens corresponding to the cloud server 425, wherein the cloud tokens facilitate suspending and resuming respective current display frames for the cloud server 425.

Generally, a thin client is a dedicated device (in this case, a game device) that depends heavily on a server to assist in or fulfill its traditional roles. The thin client may employ a computer having limited capabilities (compared to a standalone computer) and one that accommodates only a reduced set of essential applications. Typically, the thin client computer system is devoid of optical drives (CD-ROM or DVD drives), for example. The thin client depends on a central processing server, such as the cloud server 425, to function operationally. In the illustrated example of the cloud gaming arrangement 400, the first and second cloud gaming systems 405, 415 employ game devices that are respectively a cell phone and a computer tablet (i.e., a tablet) having touch sensitive screens, which are employed by a user to provide user initiated suspend and resume control commands. Other applicable thin clients include television sets, cable TV control boxes and netbooks, for example. Of course, other embodiments may employ standalone computers systems (i.e., thick clients) although they are generally not required.

The cloud server 425 serves as a gaming server in this embodiment and maintains specific data about a game world environment being played as well as data corresponding to the first and second cloud gaming systems 405, 415. As before, more than two cloud gaming systems and multiple gaming servers may be employed in this gaming environment. In the illustrated embodiment, the cloud server 425 provides a cloud gaming environment wherein a cloud gaming graphic processor is employed in the cloud server 425. The operating system in the cloud server 425 senses when one of the thin clients connects to it and starts or includes the thin client in a game that is rendered on the cloud gaming graphics processor. This display rendering information is then encoded as a compressed video stream and sent to the thin client for display.

The cloud gaming arrangement 400 provides another approach to online game playing between the first and second cloud gaming systems 405, 415. As noted earlier, the first and second cloud token modules 407, 417 serve to respectively store first and second cloud tokens that correspond to the cloud server 425 in the first and second game devices of the first and second cloud gaming systems 405, 415. Each of the first and second cloud tokens is employed by the cloud server 425 and respectively indicates suspending and resuming current gaming display frames in the first and second cloud gaming systems 405, 415.

The first and second cloud tokens are computer files that store data specific to their respective first or second cloud gaming systems 405, 415 and the cloud server 425. These cloud tokens allow the cloud server 425 to track game information for the first and second cloud gaming systems 405, 415, especially during a period when one of them suspends or resumes playing a game. In the illustrated embodiment of FIG. 4, the first cloud gaming system 405 has just suspended playing a game, and the first cloud token allows the cloud server 425 to recognize this condition or state. Then, the suspended game state of the first cloud gaming system 405 may be indicated to the second cloud gaming system 415 by the cloud server 425, thereby allowing its user to take appropriate action.

In the illustrated embodiment of FIG. 4, display rendering information for the current display frame is processed and provided by the cloud server 425 and streamed to each of the first and second game devices (i.e., the cell phone and the computer tablet). As noted, the display rendering information is sent to the first and second cloud gaming systems 405, 415 employing a compressed video stream. Of course, other approaches to providing the display rendering information may be employed. At the suspension of a game, the first and second cloud tokens are stored in a memory portion of a corresponding system memory, as indicated before. Resumption of the game reverses this action thereby making the stored game display frame and the cloud token active again.

Figure 5:
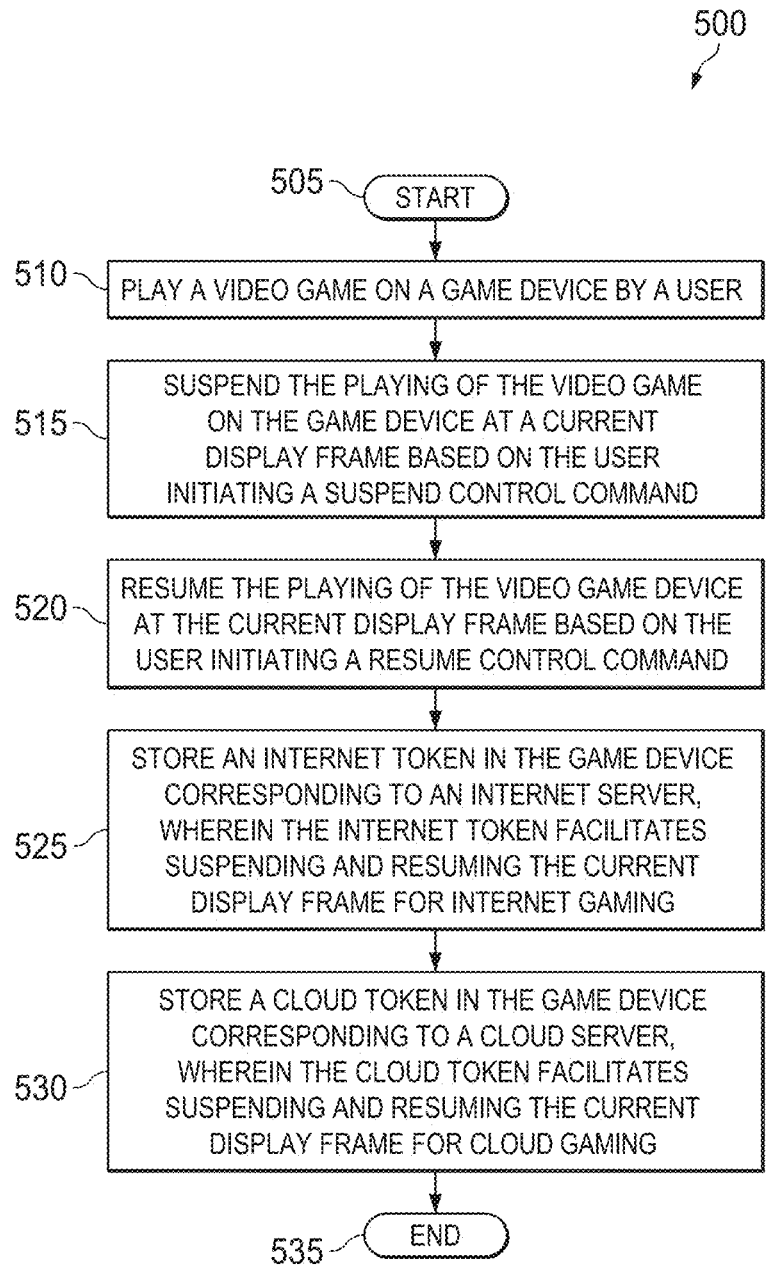
FIG. 5 illustrates a flow diagram of an embodiment of a method of quick-resume gaming carried out according to the principles of the present disclosure.

FIG. 5 illustrates a flow diagram of an embodiment of a method of quick-resume gaming, generally designated 500, carried out according to the principles of the present disclosure. The method 500 starts in a step 505, and a video game is played on a game device by a user, in a step 510. Then, the playing of the video game is suspended on the game device at a current display frame based on the user initiating a suspend control command, in a step 515. The playing of the video game is resumed on the game device at the current display frame based on the user initiating a resume control command, in a step 520.

An Internet token is stored in the game device corresponding to an Internet server, wherein the Internet token facilitates suspending and resuming the current display frame for Internet gaming, in a step 525. A cloud token is stored in the game device corresponding to a cloud server, wherein the cloud token facilitates suspending and resuming the current display frame for cloud gaming, in a step 530.

In one embodiment, display rendering information for the current display frame is stored in and retrieved from a memory contained in the game device. In another embodiment, a software module controls suspending and resuming the playing of the video game at the current display frame. Correspondingly, the software module corresponds to software included with the video game or software that is independent of the video game.

In yet another embodiment, the suspend and resume control commands correspond to actions employing at least one selected from the group consisting of a keyboard, a pointing device, a touch sensitive screen and a specialized game board. In still another embodiment, the game device is a laptop or a notebook computer and the suspend and resume control commands correspond to closing and opening the laptop or notebook computer, respectively. In a further embodiment, the game device is a thin client and display rendering information for the current display frame is provided by the cloud server. Additionally, the display rendering information is provided to the thin client employing a compressed video stream. The method 500 ends in a step 535.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A system comprising:
a cloud server that:
generates, employing a graphics processor of the cloud server, display rendering information for frames of a computer application executing at a remote client;
encodes the display rendering information as a video stream;
sends the video stream to the remote client over a network; and
facilitates, over the network, direct suspension and resumption of the computer application at a particular display frame of the computer application upon suspend and resume control commands initiated at the remote client by marking, using a cloud token, the particular display frame, at which the computer application is suspended, and resuming the computer application by providing the video stream including the particular display frame based on the cloud token,
wherein when the computer application is suspended at the remote client, the cloud token causes the cloud server to recognize that the remote client has suspended the execution of the computer application and indicate to one or more other remote clients in a same virtual environment of the computer application as the remote client that the remote client has suspended the execution of the computer application.

2. The system of claim 1, wherein the cloud token includes data specific to the remote client and the cloud server.

3. The system of claim 1, wherein the direct suspension includes moving display rendering information of the particular frame and the cloud token from memory locations that control a currently displayed frame to another memory location in the remote client.

4. The system of claim 1, wherein the cloud token allows the cloud server to track information of the computer application executing at the remote client.

5. The system of claim 1, wherein the cloud server includes an operating system that senses when the remote client connects to the cloud server and includes the remote client in the computing application that is rendered on the graphics processor of the cloud server.

6. The system of claim 1, wherein the suspend and resume control commands correspond to actions employing at least one selected from the group consisting of:
 a keyboard;
 a pointing device;
 a touch sensitive screen; and
 a specialized game board.

7. The system of claim 1 wherein the remote client is a cellular phone or a computer tablet having a touchscreen that receives the suspend and resume control commands.

8. The system of claim 1 wherein the video stream is a compressed video stream.

9. The system of claim 1, wherein the computer application is an online game.

10. The system of claim 9, wherein the cloud server indicates to another remote client playing the online game that the online game has been suspended at the remote client.

11. A method comprising:
 generating, employing a graphics processor of a cloud server, display rendering information for frames of a computer application executing at a remote client;
 encoding the display rendering information as a video stream;
 sending the video stream to the remote client over a network; and
 facilitating, over the network, direct suspension and resumption of the computer application at a particular display frame of the computer application upon suspend and resume control commands initiated at the remote client by marking, using a cloud token, the particular display frame, at which the computer application is suspended, and resuming the computer application by providing the video stream including the particular display frame based on the cloud token, wherein when the computer application is suspended at the remote client, the cloud token causes the cloud server to recognize that the remote client has suspended the execution of the computer application and indicate to one or more other remote clients in a same virtual environment of the computer application as the remote client that the remote client has suspended the execution of the computer application.

12. The method of claim 11 further comprising storing the cloud token in a cloud token module.

13. The method of claim 11, wherein the direct suspension includes moving display rendering information of the particular frame and the cloud token from memory locations that control a currently displayed frame to another memory location in the remote client.

14. The method of claim 11, wherein the cloud token stores data specific to the remote client and the cloud server and allows the cloud server to track information of the computer application executing at the remote client.

15. The method of claim 11, further comprising sensing when the remote client connects to the cloud server.

16. The method of claim 11, wherein the suspend and resume control commands correspond to actions employing at least one selected from the group consisting of:
 a keyboard;
 a pointing device;
 a touch sensitive screen; and
 a specialized game board.

17. The method of claim 11, wherein the remote client is a cellular phone or a computer tablet having a touchscreen that receives the suspend and resume control commands.

18. The method of claim 11, further comprising compressing the video stream.

19. The method of claim 11, wherein the computer application is an online game.

20. The method of claim 19, further comprising indicating to another remote client playing the online game that the online game has been suspended at the remote client.

\* \* \* \* \*